(12) United States Patent
Odendall

(10) Patent No.: US 8,001,766 B2
(45) Date of Patent: Aug. 23, 2011

(54) METHOD FOR CHECKING THE FRICTION CAPABILITY OF AN EXHAUST GAS CATALYTIC CONVERTER

(75) Inventor: Bodo Odendall, Lenting (DE)

(73) Assignee: Audi AG, Ingolstadt (DE)

( * ) Notice: Subject to any disclaimer, the term of this patent is extended or adjusted under 35 U.S.C. 154(b) by 1159 days.

(21) Appl. No.: 11/785,830

(22) Filed: Apr. 20, 2007

(65) Prior Publication Data

US 2007/0277503 A1 Dec. 6, 2007

(30) Foreign Application Priority Data

Apr. 21, 2006 (DE) .......................... 10 2006 018 662

(51) Int. Cl.
*F01N 3/00* (2006.01)
(52) U.S. Cl. ................ 60/277; 60/274; 60/285; 60/295; 60/301
(58) Field of Classification Search .................. 73/114.1, 73/114.03, 114.32, 114.34, 114.36, 114.69, 73/114.75; 60/277, 284–286
See application file for complete search history.

(56) References Cited

U.S. PATENT DOCUMENTS

| | | | | |
|---|---|---|---|---|
| 5,626,014 | A | * | 5/1997 | Hepburn et al. ................ 60/274 |
| 7,076,943 | B2 | * | 7/2006 | Lewis et al. .................... 60/285 |
| 2002/0078683 | A1 | * | 6/2002 | Katayama et al. .............. 60/285 |

FOREIGN PATENT DOCUMENTS

DE 10 2004 008 172 10/2005

* cited by examiner

*Primary Examiner* — Thomas Denion
*Assistant Examiner* — Jesse Bogue
(74) *Attorney, Agent, or Firm* — Novak Druce + Quigg LLP

(57) ABSTRACT

In a process for monitoring the function capability of an exhaust-gas catalytic converter 5 located in the exhaust line 3 of an internal combustion engine 1, based on the measured or computed signals of a first lambda probe 6a located upstream from the catalytic converter 5 and of a second lambda probe 6b located downstream from the catalytic converter 5, the two lambda probes 6a, 6b and the catalytic converter 5 having reached their operating temperature, it is suggested that an air quantity control means 4 located in the intake line 2 is partially opened during the coasting phase of the internal combustion engine 1 in order to cool the catalytic converter 5 located in the exhaust line 3, so that in the catalytic converter 5 an axial temperature distribution forms over time, from the signals of the two lambda probes 6a, 6b and the temperature distribution the axial distribution of the oxygen storage capacity OSC of the catalytic converter 5 being computed, and using this distribution of the oxygen storage capacity OSC the functional capability of the exhaust-gas catalytic converter 5 being assessed. As suggested, an improved process for checking is made available which moreover allows differentiation of the functional capability for conversion of hydrocarbons and nitrogen oxides.

6 Claims, 4 Drawing Sheets

US 8,001,766 B2

METHOD FOR CHECKING THE FRICTION CAPABILITY OF AN EXHAUST GAS CATALYTIC CONVERTER

CROSS-REFERENCE TO RELATED APPLICATIONS

This application claims priority from German Application No. 10 2006 018 662.1, filed Apr. 21, 2006.

This invention relates to a process for checking the function capability of an exhaust-gas catalytic converter located in the exhaust line of an internal combustion engine, based on the computed or measured signals of a first lambda probe located upstream from the catalytic converter and of a second lambda probe located downstream from the catalytic converter, the two lambda probes and the catalytic converter having reached their operating temperature.

DE 199 13 901 C2 discloses a process for checking the functional capability of the catalytic converter of a lambda-controlled internal combustion engine, the catalytic converter efficiency being determined by ascertaining the temperature-dependent oxygen storage capacity. The oxygen storage capacity yields a measure of the functional capability of the catalytic converter, this measure however being definitive only in steady-state or quasi steady-state operating state.

Document DE 42 01 136 C2 discloses a process for monitoring the functional capability of a catalytic exhaust system of an internal combustion engine, the catalytic converter having a number of temperature sensors for detection of the axial and time behavior, and on that basis the catalytic activity of the exhaust system is determined.

On the basis of this prior art, the object of this invention is to make available an improved process for checking the functional capability of an exhaust-gas catalytic converter which allows onboard diagnosis during operation of the internal combustion engine and in the case of a defect of the catalytic converter enables differentiation of the defect following inadequate conversion of the hydrocarbon during reduction and following insufficient conversion of nitrogen oxides during oxidation, as will be required by future stricter legislation. Moreover as much as possible no additional emissions will be caused by this process and this inboard diagnosis.

This object is achieved by an air quantity control means located in the intake line of the internal combustion engine being at least partially opened during the coasting phase of the internal combustion engine in order to cool the catalytic converter located in the exhaust line of the internal combustion engine, so that in the catalytic converter an axial temperature distribution forms over time, from the signals of the two lambda probes and the temperature distribution the axial distribution of the oxygen storage capacity of the catalytic converter being computed, and using this distribution of the oxygen storage capacity the functional capability of the exhaust-gas catalytic converter being assessed. So that it is ensured that possible moisture in the exhaust line does not precipitate on the lambda probes, which could damage them, and that the catalytic converter already shows its conversion performance by which exhaust gas emissions are kept low, for setting the temperature gradient in the catalytic converter, for example a heat-up phase following a cold start of the internal combustion engine is not used, but an artificial cooling phase is produced. Here the relationship that the oxygen storage capacity of the catalytic converter also changes with the temperature-dependent pollutant conversion is used. So that the degree of the artificial cooling phase is sufficient, the air quantity control means is at least partially or completely opened so that a change of the signals of the lambda probes which can be evaluated and a sufficient temperature gradient over the different axial regions of the catalytic converter occur.

Within the catalytic converter, the axial temperature distribution can be measured over time by means of a temperature acquisition means or computed by means of a temperature model. For reasons of costs, primarily the use of a temperature model is recommended, but its having to have a corresponding accuracy, so that the catalytic converter can be divided for example into five succeeding temperature regions.

Advantageously, based on the axial distribution of the oxygen storage capacity various axial regions of the catalytic converter are assessed. To do this the computed oxygen storage capacities are compared to given boundary values for the different axial regions, which values must be maintained.

In the case of damage at the beginning of the catalytic converter, poorer conversion of hydrocarbons (HC) can be deduced. This is because the reduced oxygen storage capacity of the beginning has an effect on the conversion of the increased formation of hydrocarbons especially during heat-up of the catalytic converter, since most of the HC conversion must be performed by the initially heated first region of the catalytic converter.

And for damage at the end of the catalytic converter, poorer conversion of nitrogen oxides (NOx) can be deduced. This is because the reduced oxygen storage capacity of the end acts on conversion of the increased proportion of nitrogen oxides during cooling and during lean operation, since most of the NOx conversion must be performed by the uncooled last region of the catalytic converter.

Preferably the process is carried out at given time intervals in which a significant decrease of the functional capability of the catalytic converter can be expected. This is because by opening the air quantity control means and cooling the catalytic converter the total balance of exhaust gas emission is otherwise unnecessarily degraded and the catalytic converter is unnecessarily burdened.

This invention will be explained with reference to the following drawings.

Figure 1:
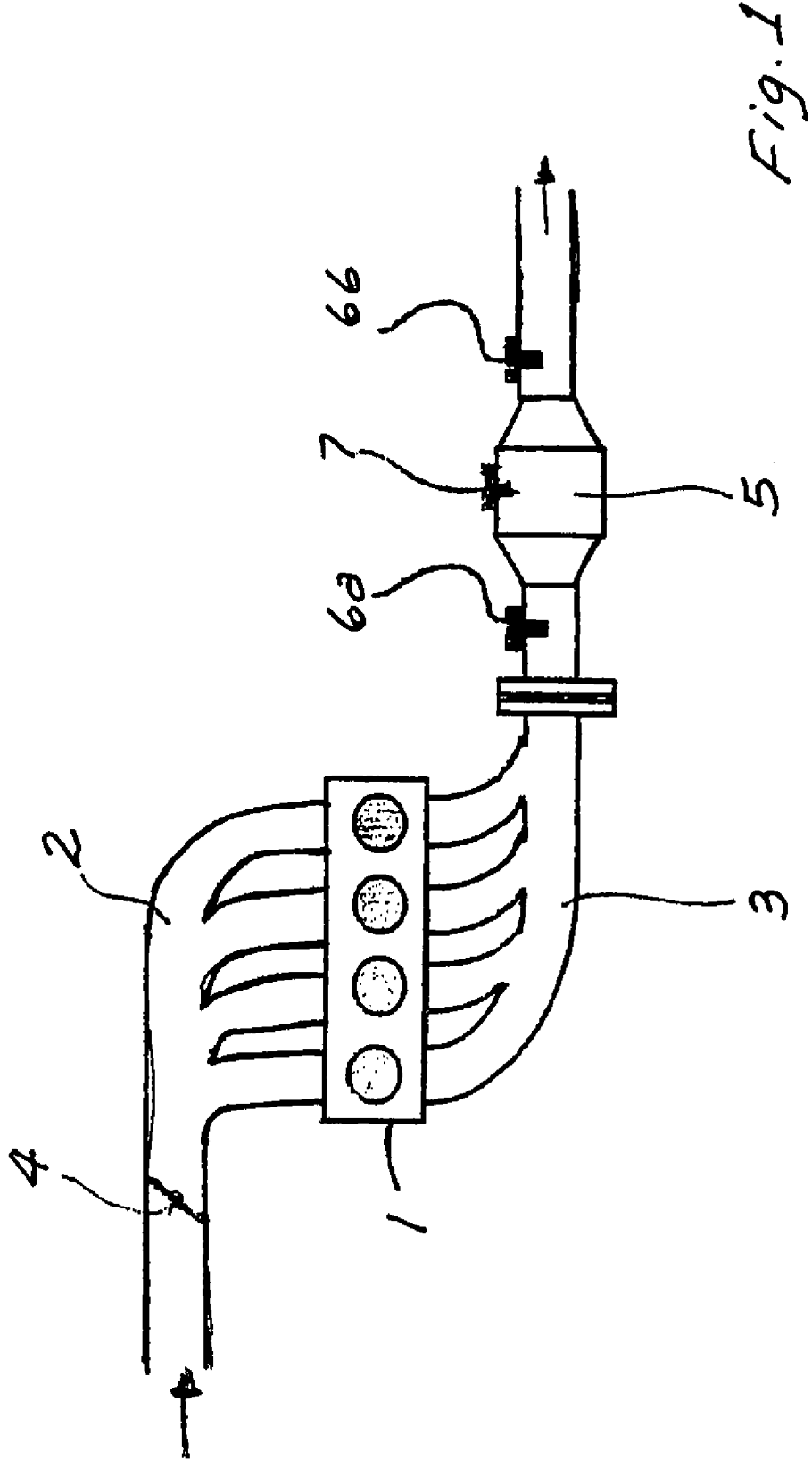
FIG. 1 shows a schematic of an internal combustion engine with a catalytic converter in which the proposed process is used.

The simplified representation from FIG. 1 shows an internal combustion engine 1 with an upstream intake line 2 and a downstream exhaust line 3.

The intake line 2 comprises an air quantity control means 4 which is made for example as a simple flap and which limits the amount of air supplied to the internal combustion engine.

The exhaust line 3 comprises a catalytic converter 5 which is made for example as a three-way catalytic converter, a first lambda probe 6a located upstream from the catalytic converter 5, and a second lambda probe 6b located downstream from the catalytic converter 5. Moreover a temperature acquisition means 7 can be assigned to the catalytic converter; it comprises a number of individual sensors distributed equidistantly axially to the catalytic converter, by which the temperature distribution which forms within the catalytic converter 5 can be directly measured.

The measured signal of the first lambda probe 6a however can also be replaced by a lambda value obtained by means of model computation. And the temperature distribution can also be computed instead of a measurement by the temperature acquisition means 7 likewise by means of a temperature model.

As claimed in the invention, the air quantity control means 4 can be for example completely opened when there is a coasting phase in the internal combustion engine 1 for a period of up to 10 seconds. In this way the catalytic converter which is hot from operation and which is located in the exhaust line is flooded with intake air and effectively cooled, so that in its interior a temperature gradient suitable for its subsequent evaluation is formed.

Figure 2:
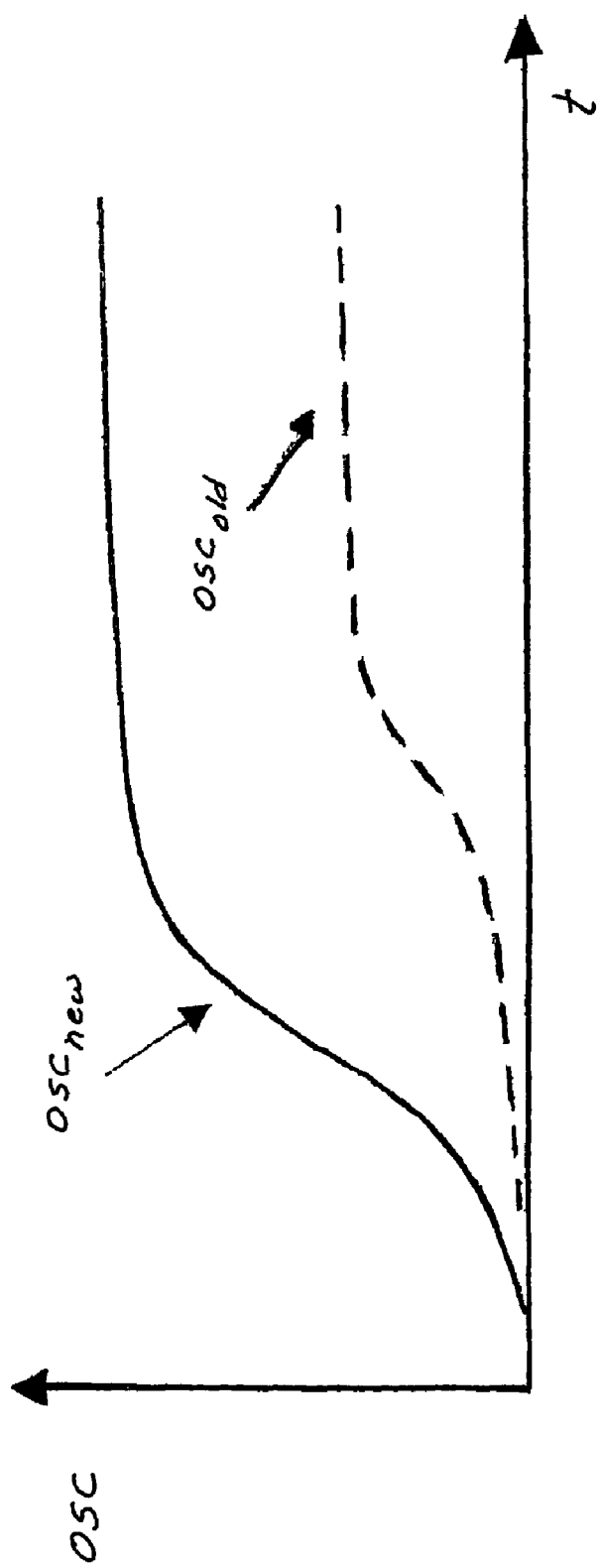
FIG. 2 shows a first diagram of the oxygen storage capacity of a new and an old catalytic converter over temperature.
Figure 3:
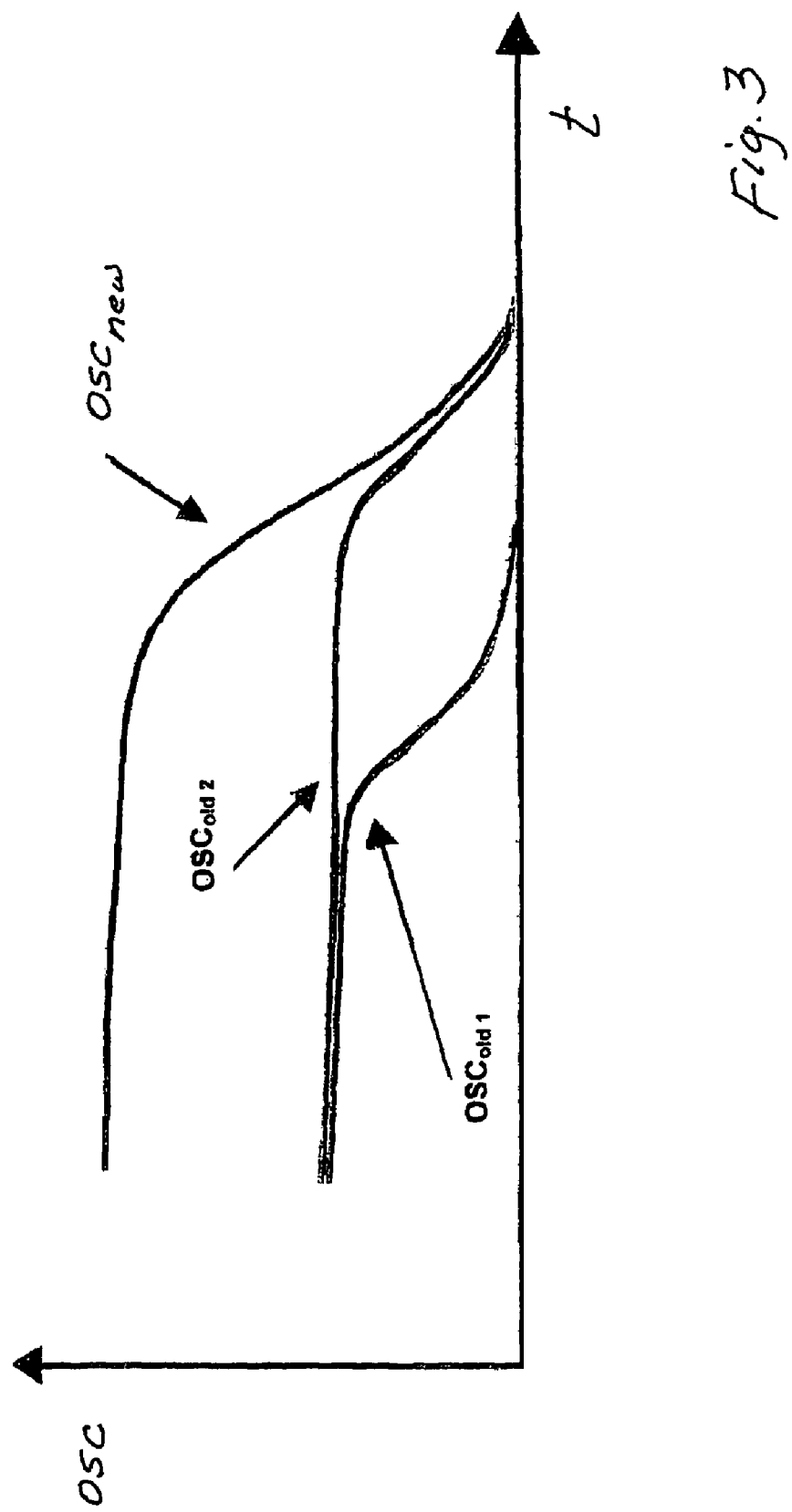
FIG. 3 shows a second diagram of the oxygen storage capacity of a new and an old catalytic converter over time.

FIGS. 2 and 3 illustrate how the oxygen storage capacity OSC of the catalytic converter 5 computed from the signals of the two lambda probes 6a, 6b and the temperature distribution changes as a function of ageing.

In FIG. 2, by comparing a first curve $OSC_{new}$ for a new catalytic converter 5 and a second curve $OSC_{old}$ for an old catalytic converter 5, it becomes clear that the maximum attainable oxygen storage capacity OSC is reduced with increasing ageing. Moreover, with increasing ageing the average temperature T at which the catalytic converter 5 reaches is maximum oxygen storage capacity OSC is pushed up.

And in FIG. 3, using the first curve $OSC_{new}$ for a new catalytic converter 5 and two other curves $OSC_{old1}$ and $OSC_{old2}$ for equally old catalytic converters 5, it is shown that the maximum attainable oxygen storage capacity OSC of the catalytic converter 5 decreases as ageing increases. In this connection moreover the effect arises that damage of the region located in the flow direction at the beginning of the catalytic converter 5 according to curve $OSC_{old1}$ causes a drop of the oxygen storage capacity OSC earlier in time, while damage of the region which is located in the flow direction at the end of the catalytic converter 5 according to curve $OSC_{old2}$ does not have a major effect on the drop of the oxygen storage capacity OSC.

Figure 4:
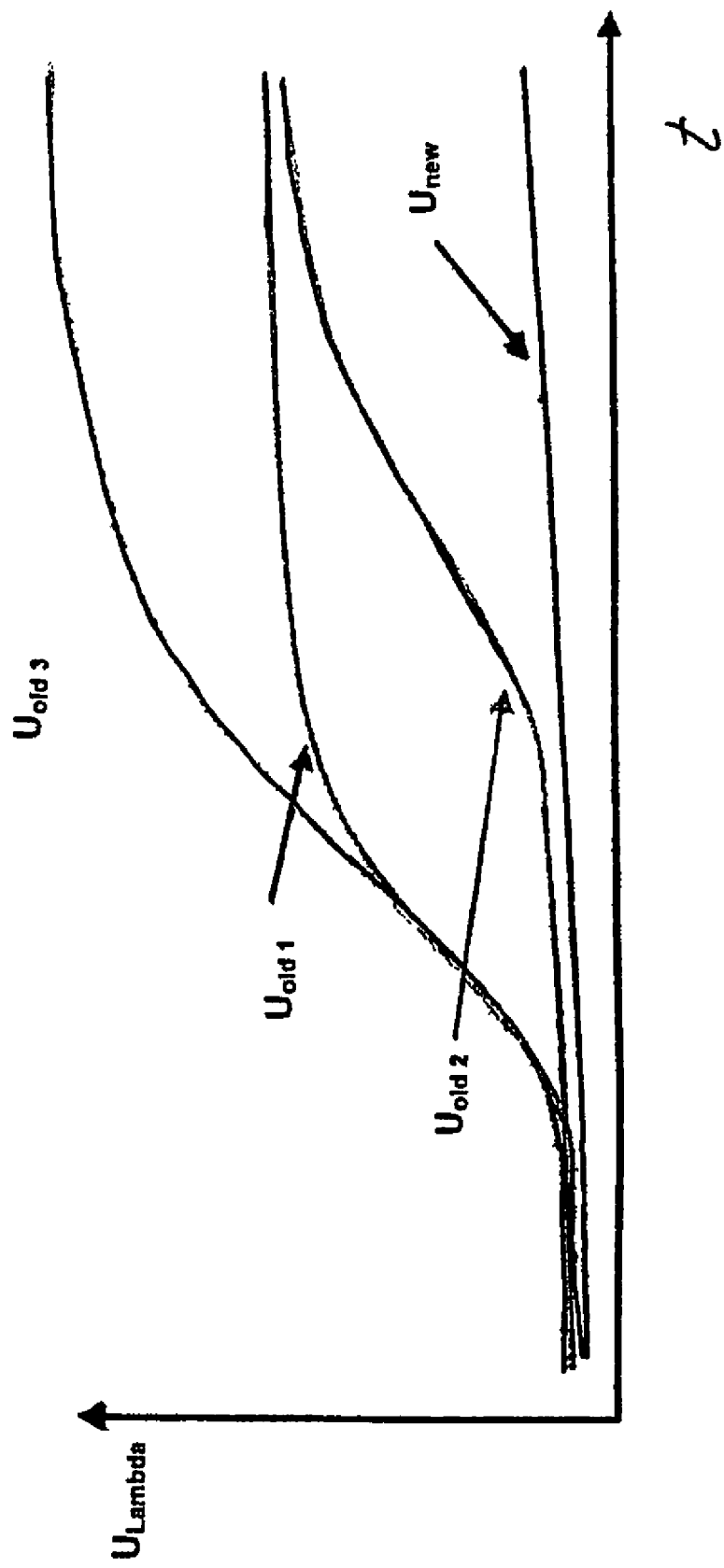
FIG. 4 shows another diagram of various signals of the lambda probe following the catalytic converter over time.

Finally, FIG. 4 shows how the presence of damage of different axial regions of the catalytic converter 5 can be deduced from the behavior of the voltage signal $U_{Lambda}$ of the second lambda probe 6b located downstream from the catalytic converter 5 over time t. For this purpose, FIG. 4 contains a first curve $U_{new}$ for a new catalytic converter 5 without damage and three other curves $U_{old1}$, $U_{old2}$ and $U_{old3}$ for an old catalytic converter 5 with different damage. Fundamentally, it applies that the second lambda probe 6b indicates the presence of damage of the catalytic converter 5 by the voltage signal $U_{Lambda}$ of the second lambda probe 6b rising prematurely. In this connection, for damage of the region of the catalytic converter 5 which lies in the flow direction at the beginning according to curve $U_{old1}$ the rise occurs earlier in time than for damage of the region of the catalytic converter 5 located in the flow direction at the end according to curve $U_{old2}$. If however there is damage both to the beginning region and also the end region in the aged catalytic converter 5, the rise of the voltage signals of the two curves $U_{old1}$ and $U_{old2}$ is added so that behavior according to curve $U_{old3}$ results.

If therefore there is damage at the beginning of the catalytic converter 5, the expected degradation of the conversion of hydrocarbons (HC) to be managed especially during the starting phases is deduced and if the damage is at the end of the catalytic converter 5, conversely the expected deterioration of conversion of hydrocarbons (HC) or nitrogen oxides ($NO_x$) is deduced. Accordingly a defect of the catalytic converter 5 is finally indicated.

REFERENCE NUMBERS

1 internal combustion engine
2 intake line
3 exhaust line
4 air quantity control means
5 exhaust-gas catalytic converter
6a first lambda probe
6b second lambda probe
7 temperature detection means

The invention claimed is:

1. A method of assessing the conversion effectiveness of a catalytic converter of an internal combustion engine including an air intake line, an exhaust gas line provided with said catalytic converter and lambda probes disposed in said gas discharge line upstream and downstream of said catalytic converter comprising:
supplying intake an to said catalytic converter while said engines is in an idling mode, producing a temperature gradient along the length of said catalytic converter;
determining said temperature gradient; and
deducing a degraded conversion of hydrocarbon upon a finding of a decrease in the oxygen storage capacity at the beginning of flow in the catalytic converter, and a degraded conversion of nitrogen oxides upon a finding of a decrease in the oxygen storage capacity at the end of flow in the catalytic converter.

2. The method according to claim 1 wherein determination of said temperature gradient includes sensing signals of temperature sensors provided on said catalytic converter and of said probes.

3. The method of claim 2 wherein said temperature sensors are equidistantly spaced along a flow line of said catalytic converter.

4. The method of claim 1 wherein determination of said temperature gradient is provided by means of a temperature model.

5. The method of claim 2 wherein the signal of the upstream probe is provided by a lambda value obtained by means of a model computation.

6. The method of claim 1 wherein said procedure is conducted periodically following a predetermined period of use of said catalytic converter.

* * * * *